(12) United States Patent
Smith et al.

(10) Patent No.: US 11,973,611 B2
(45) Date of Patent: Apr. 30, 2024

(54) METHODS, SYSTEMS, AND PROGRAM PRODUCTS FOR IDENTIFYING LOCATION OF PROBLEMS OF DELIVERED AUDIO

(71) Applicant: Lenovo (Singapore) Pte. Ltd., New Tech Park (SG)

(72) Inventors: Joshua Smith, Milton, FL (US); Carl H. Seaver, Bainbridge, IN (US); Matthew Fardig, Boonville, IN (US); Inna Zolin, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/864,845

(22) Filed: Jul. 14, 2022

(65) Prior Publication Data

US 2024/0022445 A1    Jan. 18, 2024

(51) Int. Cl.
*H04L 12/18* (2006.01)
*G06F 40/279* (2020.01)

(52) U.S. Cl.
CPC ........ *H04L 12/1822* (2013.01); *G06F 40/279* (2020.01); *H04L 12/1831* (2013.01)

(58) Field of Classification Search
CPC ............................ H04L 12/1822; G06F 40/279

USPC .......................................................... 709/204
See application file for complete search history.

(56) References Cited

U.S. PATENT DOCUMENTS

| 9,031,828 B2* | 5/2015 | Leydon | G06F 40/232 704/3 |
|---|---|---|---|
| 2012/0082304 A1* | 4/2012 | Byrne | H04L 1/205 379/202.01 |
| 2015/0012271 A1* | 1/2015 | Peng | G10L 15/08 704/235 |
| 2020/0175961 A1* | 6/2020 | Thomson | G10L 15/28 |
| 2022/0343897 A1* | 10/2022 | Agarwal | G10L 15/063 |

* cited by examiner

*Primary Examiner* — Sibte H Bukhari
(74) *Attorney, Agent, or Firm* — Kunzler Bean & Adamson

(57) ABSTRACT

Methods, systems, and program products are disclosed for determining location of audio transmission problems between components connected across a network. A method includes receiving audio and a first transcription of the audio from a source device, generating a second transcription of the received audio. The method also includes providing an indication of an audio problem responsive to the first transcription not matching the second transcription and sending the audio and the second transcription to an audio mixing device, a recording device, or a participant device responsive to the first transcription matching the second transcription.

14 Claims, 8 Drawing Sheets

METHODS, SYSTEMS, AND PROGRAM PRODUCTS FOR IDENTIFYING LOCATION OF PROBLEMS OF DELIVERED AUDIO

FIELD

The subject matter disclosed herein relates to identifying location of audio transmission problems across network components.

BACKGROUND

Many factors play a role in whether network transmitted audio is good or not. It can often be difficult to determine where a problem exists. Sometimes sensed network conditions look great, yet a listener is unable to understand them due to a poor connection on the user's side.

BRIEF SUMMARY

Methods, systems, and program products are disclosed for determining location of audio transmission problems between components connected across a network.

A method, in one embodiment, includes receiving audio and a first transcription of the audio from a source device, generating a second transcription of the received audio, providing an indication of an audio problem responsive to the first transcription not matching the second transcription, and sending the audio and the second transcription to an audio mixing device, a recording device, or a participant device responsive to the first transcription matching the second transcription.

A system, in one embodiment, includes: a processor; and storage device configured to store machine-readable instructions, wherein execution of the machine-readable instructions that, when executed by the processor, cause the processor to receive audio and a first transcription of the audio from a source device, generate a second transcription of the received audio; provide an indication of an audio problem responsive to the first transcription not matching the second transcription, and send the audio and the second transcription to an audio mixing device, a recording device, or a participant device responsive to the first transcription matching the second transcription.

A non-transitory computer-readable medium storing machine-readable instructions that, when executed by a processor, in one embodiment, cause the processor to receive audio and a first transcription of the audio from a source device; generate a second transcription of the received audio, provide an indication of an audio problem responsive to the first transcription not matching the second transcription, and send the audio and the second transcription to an audio mixing device, a recording device, or a participant device responsive to the first transcription matching the second transcription.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be limiting of scope, the embodiments will be described and explained with additional specificity and detail using the accompanying drawings, in which.

DETAILED DESCRIPTION

Figure 1:
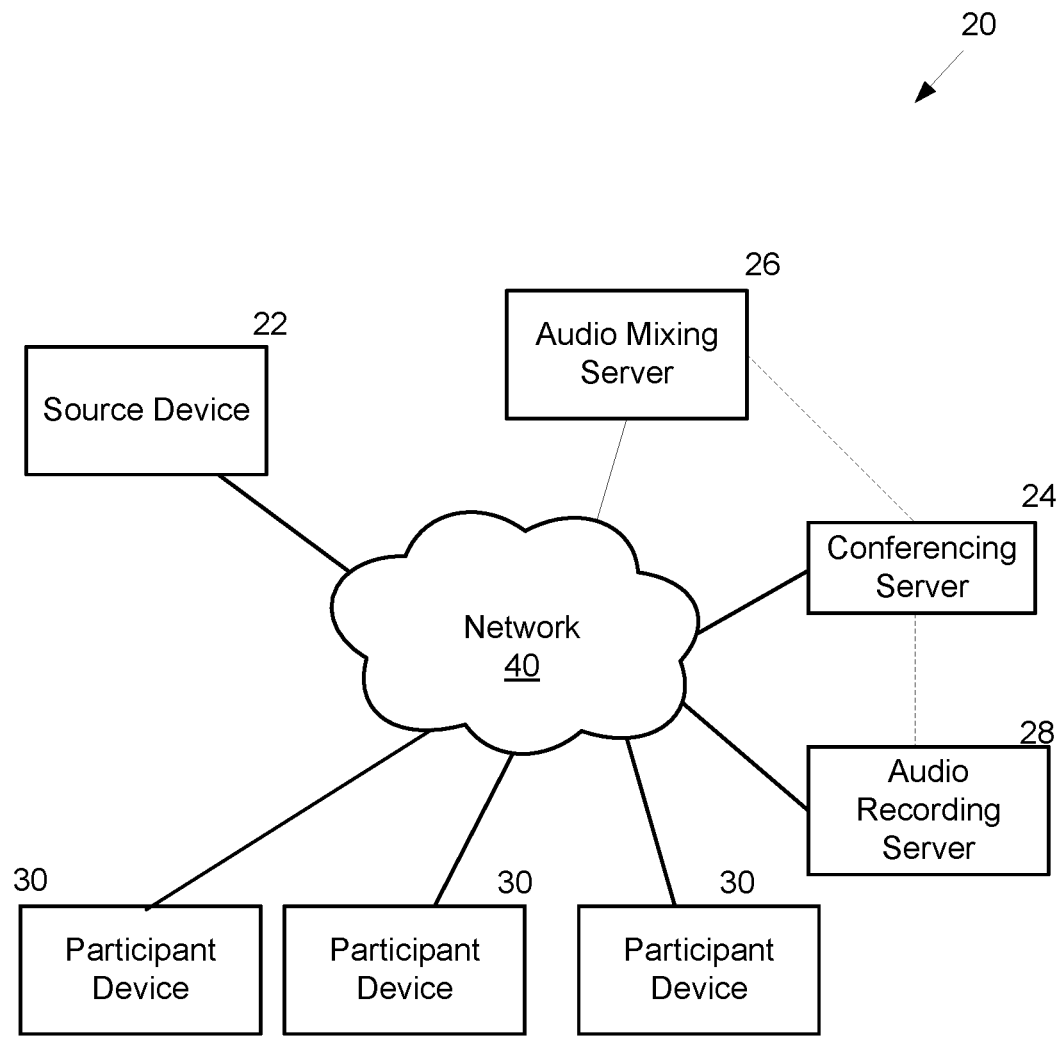
FIG. 1 is a schematic block diagram illustrating a network system for performing audio transmission.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an electrically erasable programmable read-only memory (EEPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The apparatuses, methods, systems, program products, and their respective embodiments disclosed herein determine location of audio transmission problems between components connected across a network. The description of elements in each figure may refer to elements of proceeding figures. Like numbers refer to like elements in all figures, including alternate embodiments of like elements.

FIG. 1 is a block diagram of a network system 20 with various devices (a source device 22, participant devices 30) and various servers (a conferencing server 24, an audio recording server 28, and an audio mixing server 26) coupled to a network 40 (public or private data network). In this regard, it should be understood that the configuration of FIG. 1 is exemplary only, and that the disclosed methods may be implemented on other types of network systems and components. It should be further understood that while certain components of the network system 20 are shown in FIG. 1 for illustrating embodiments of the present disclosure, the network system 20 is not restricted to including only those components shown in FIG. 1 and described below.

Figure 2:
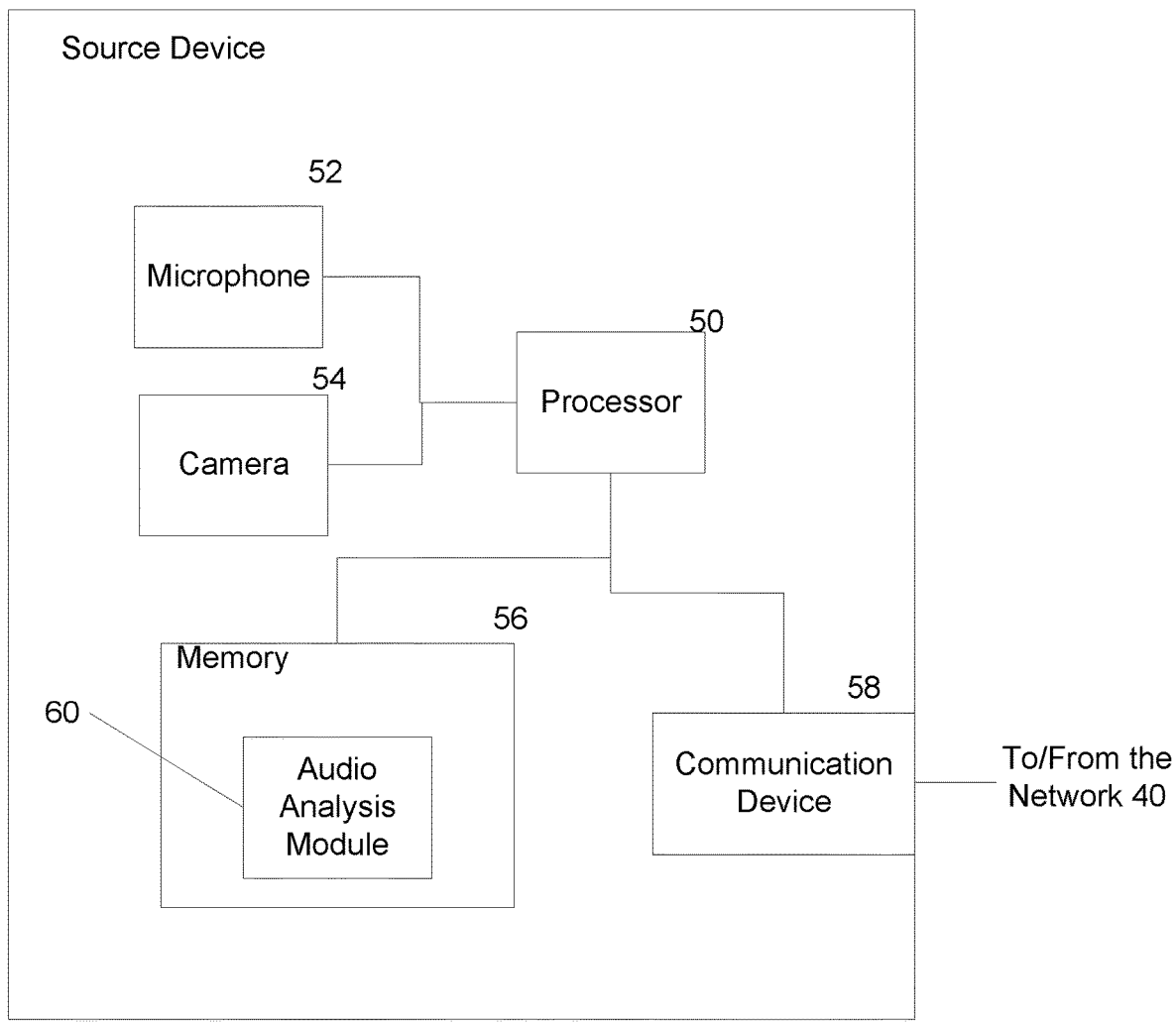
FIG. 2 is a schematic block diagram of a component of the system of FIG. 1.

As shown in FIGS. 1 and 2, in various embodiments, each of the components (the source device 22, the conferencing server 24, the audio mixing server 26, the audio recording server 28 and the participant devices 30) are capable of receiving audio and a transcription of the audio from any of the other components, generating its own transcription of the received audio, and comparing the generated transcription to the received transcription to determine if a match exists. If the component determines that a match does not exist based on the received transcription not matching with the generated transcription, then the component determines that an audio problem exists between the component that sent the audio and the device that received the audio. The determined problem may be transmitted back to a controlling server, such as without limitation the conferencing server 24, for mitigating, correcting, or identifying to users the identified link associated with the problem. It can be appreciated to one of ordinary skill, that servers and devices described above may be any servers or computing devices where audio is transmitted from a source component to another component and is not limited to a conferencing scenario.

Referring to FIG. 2, in various embodiments the source device 22 includes a processor 50, a microphone 52, an optional camera 54, a memory 56 and a communication device 58. The memory 56 is a non-transitory computer-readable medium configured to store machine-readable instructions configured to cause the processor 50 to perform the functions described below. The instructions include an audio analysis module 60 that is configured to cause the processor 50 to generate a transcription of audio received from the microphone 52. The audio analysis module 60 is also configured to cause the processor 50 to transmit the received audio and the transcription of the audio to the conference server 24 via the network 40 and the communication device 58.

Figure 3:
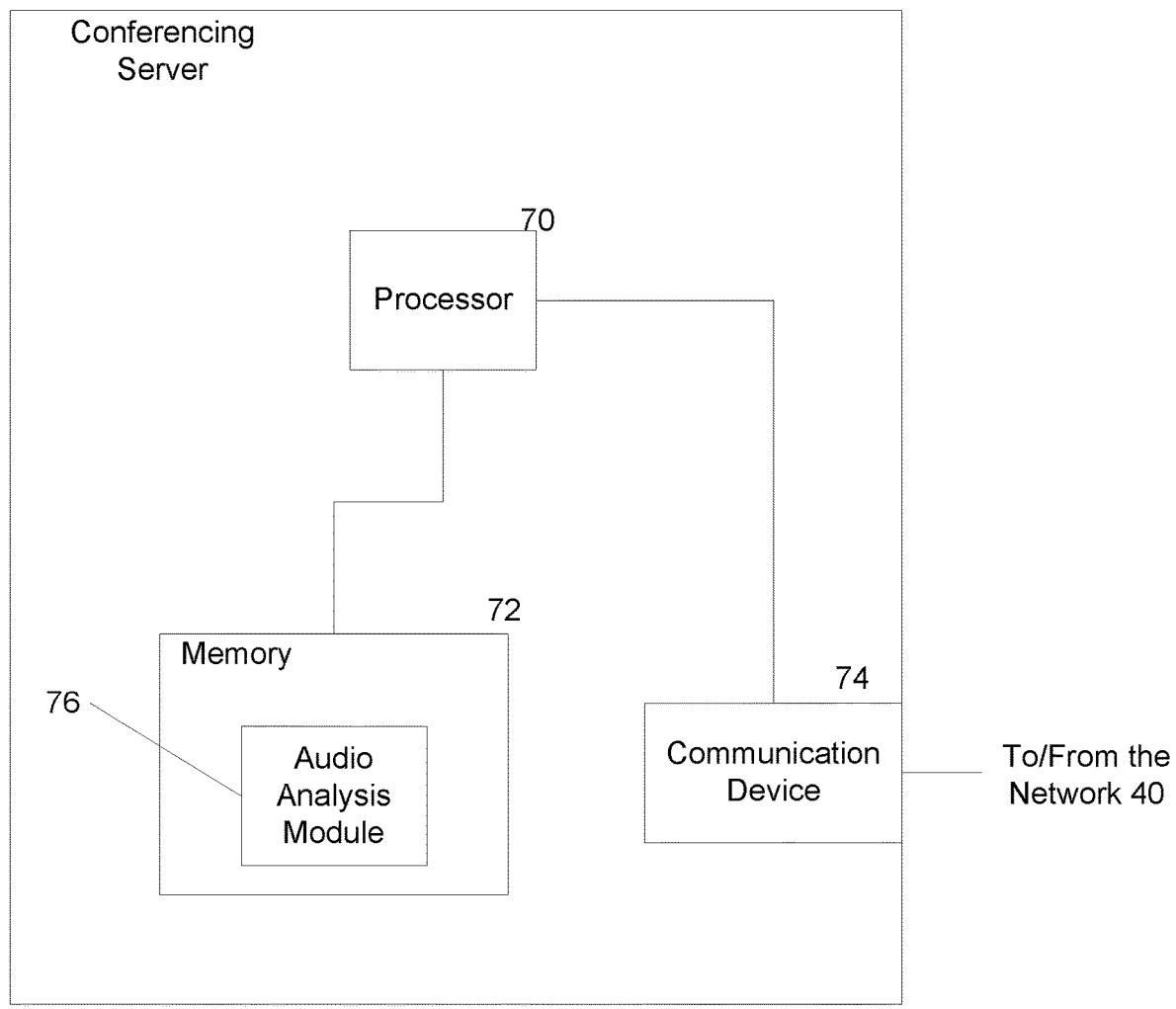
FIG. 3 is a schematic block diagram of a component of the system of FIG. 1.

Referring to FIG. 3, in various embodiments, the conferencing server 24 includes a processor 70, a memory 72, and a communication device 74. The memory 72 is a non-transitory computer-readable medium configured to store machine-readable instructions configured to cause the processor 70 to perform the functions described below. The conferencing server 24 is configured to receive the audio and the transcription of the audio from the source device 22 via the network 40 and the communication device 74. The instructions include an audio analysis module 76 that is configured to cause the processor 70 to generate a transcription of the received audio. The audio analysis module 76 further causes the processor 70 to further compare the received transcription to the generated transcription to determine if a match exists. If a match is determined to exist, then the audio link between the source device 22 and the conference server 24 is good. If a match does not exist, then an indication that the audio link between the source device 22 and the conference server 24 is not good.

Figure 4:
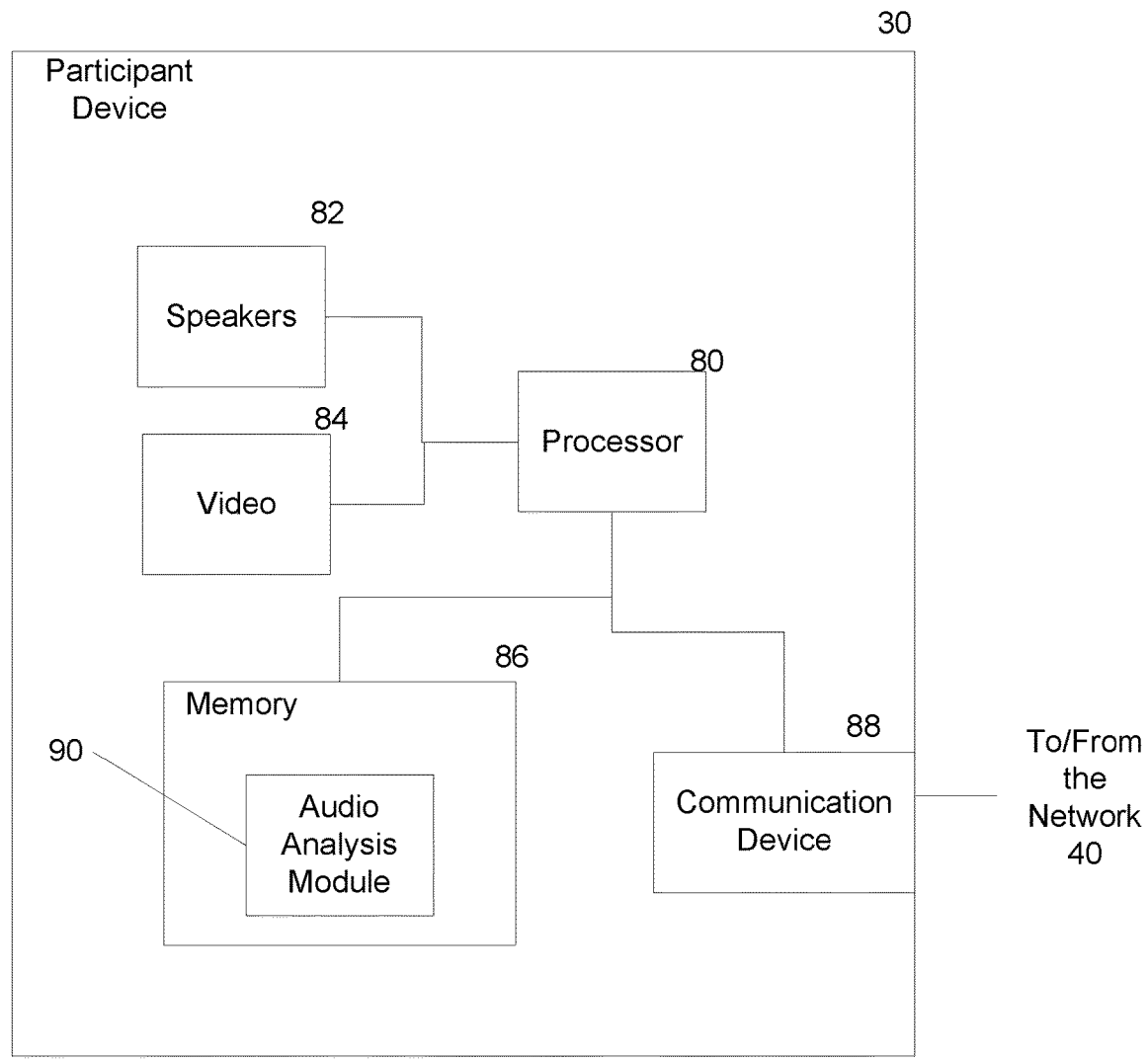
FIG. 4 is a schematic block diagram of a component of the system of FIG. 1.
Figure 5:
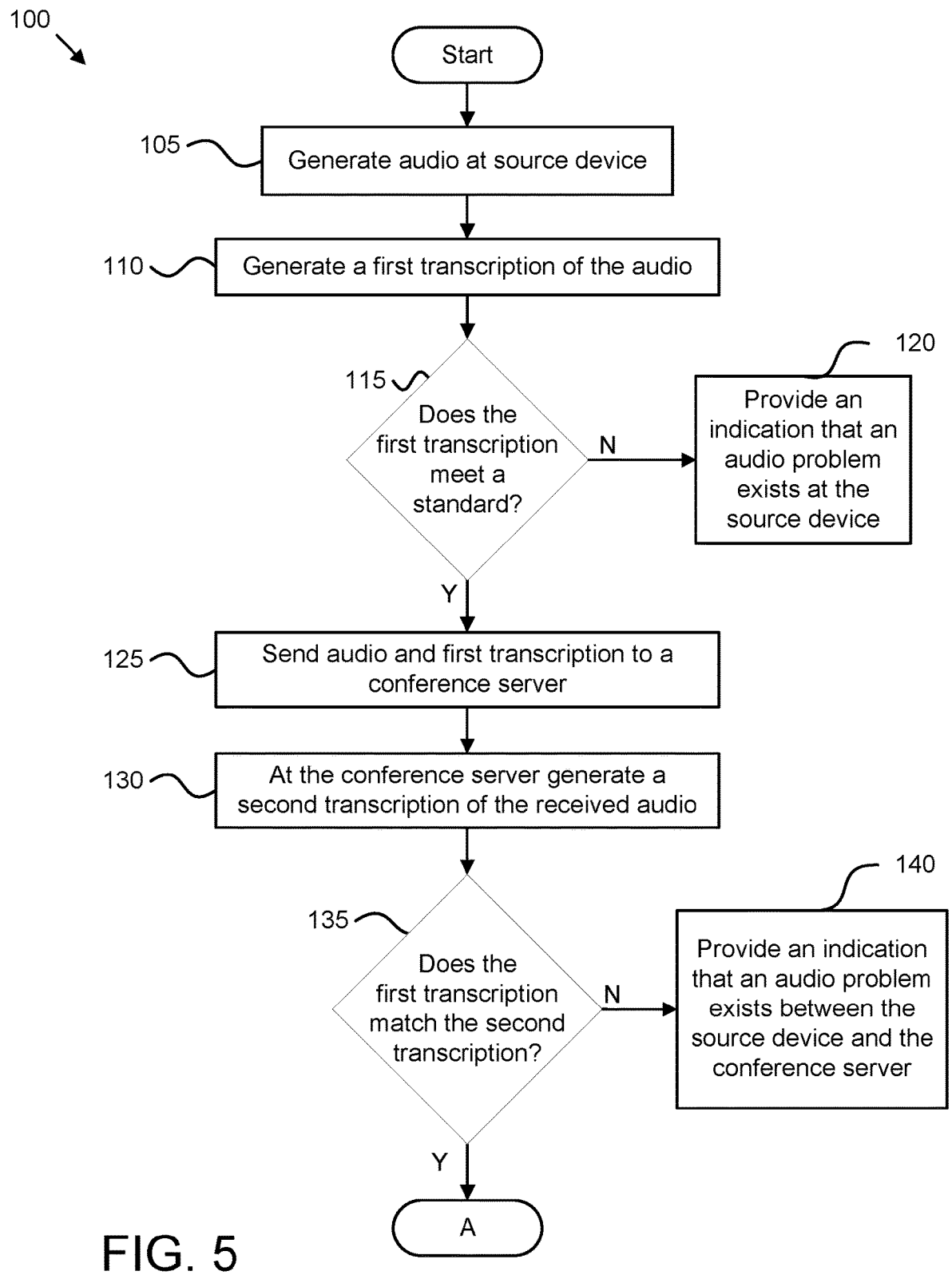
FIG. 5 is a schematic flow chart diagram illustrating one embodiment of a method for detecting audio transmission issues.
Figure 6:
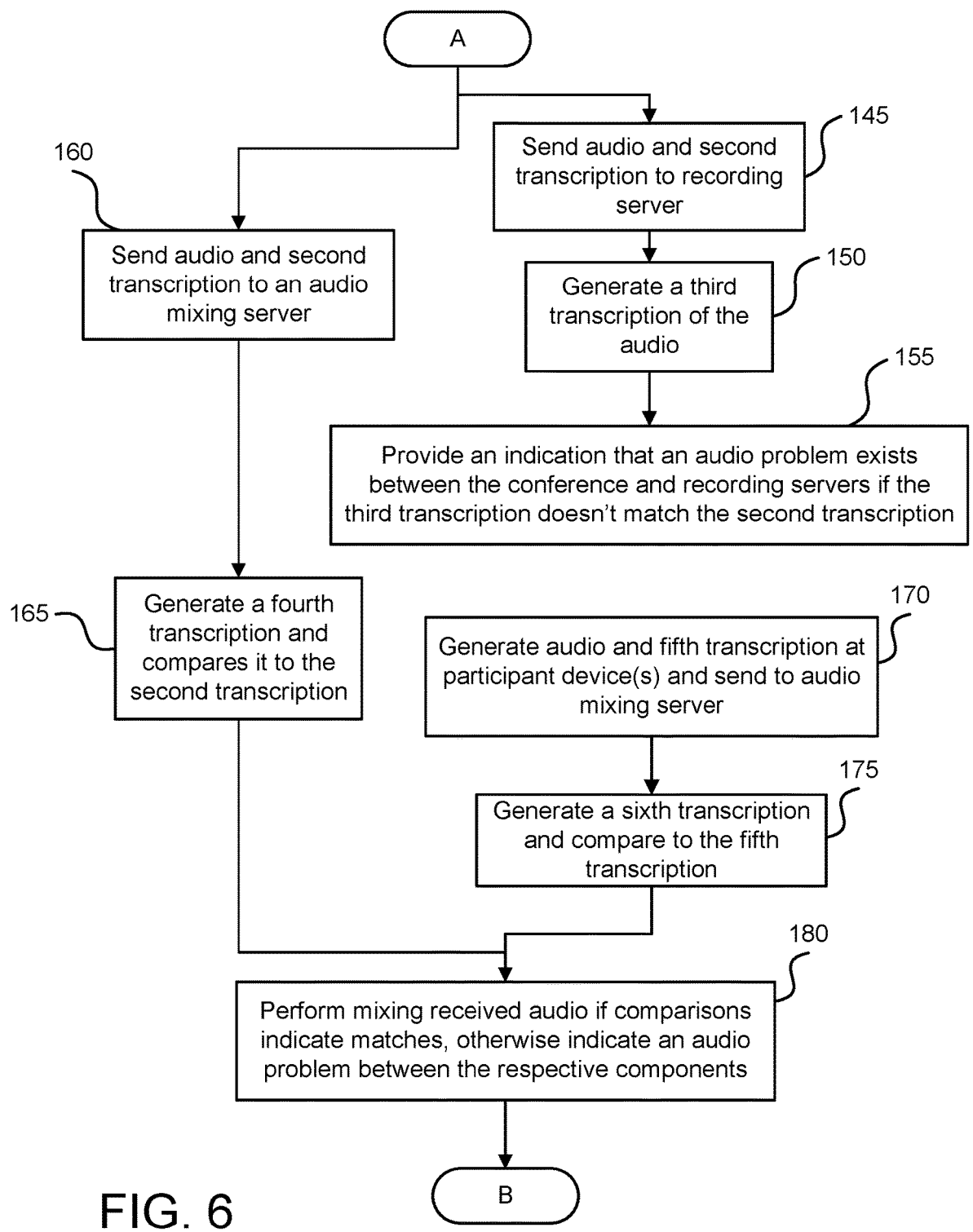
FIG. 6 is a schematic flow chart diagram illustrating one embodiment of a method for detecting audio transmission issues.
Figure 7:
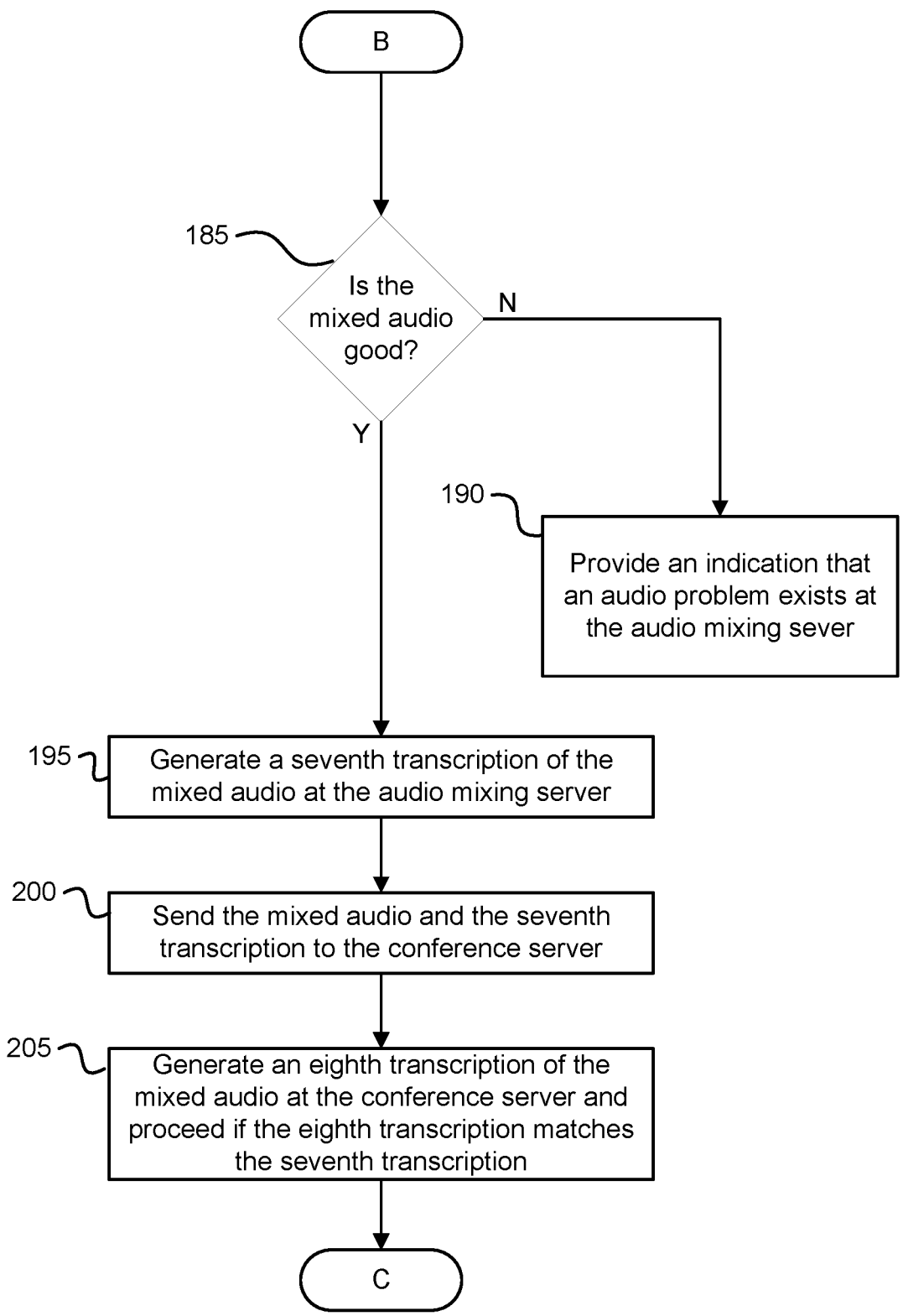
FIG. 7 is a schematic flow chart diagram illustrating one embodiment of a method for detecting audio transmission issues.
Figure 8:
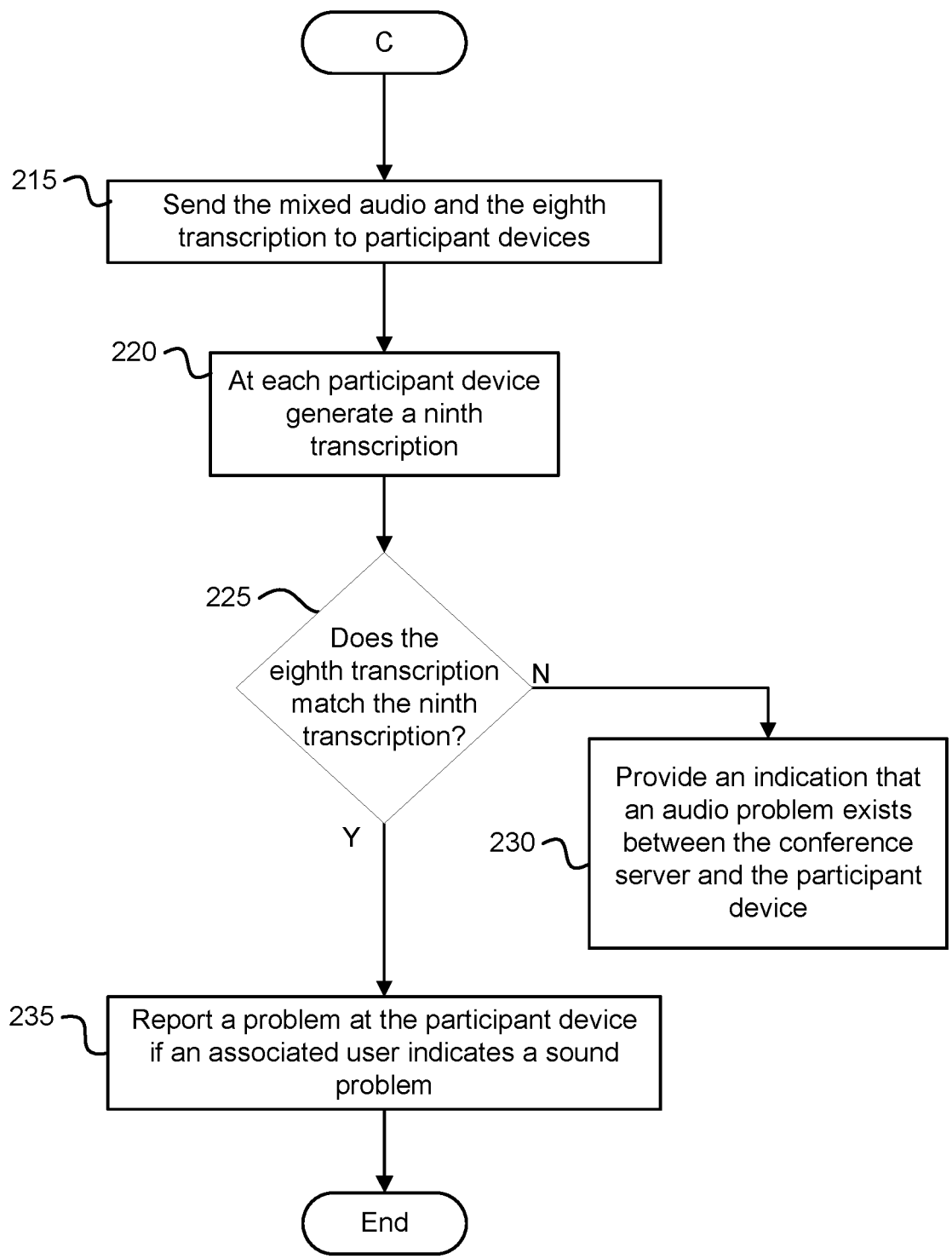
FIG. 8 is a schematic flow chart diagram illustrating one embodiment of a method for detecting audio transmission issues.

Referring to FIG. 4, the participant device 30 includes a processor 80, one or more speakers 82, and optional video device 84 a memory 86 and to communication device 88. The memory 86 is a non-transitory computer-readable medium configured to store machine-readable instructions configured to cause the processor 80 to perform the functions described below. The participant device 30 is configured to receive the audio and the transcription of the audio from the conference server 24, the audio mixing server 26, or the audio recording server 28 via the network 40 and the communication device 88. The instructions include an audio analysis module 90 that is configured to cause the processor 80 to generate a transcription of the received audio. The audio analysis module 90 further causes the processor 80 to further compare the received transcription to the generated transcription to determine if a match exists. If a match is determined to exist, then the audio link between the participant device 30 and the participant device 30 is good. If a match does not exist, then an indication that the audio link between the participant device 30 and the conference server 24 is not good.

In various embodiments, the produced indications of bad audio links may be provided to any of the components of the network system 20 for presentation to associated user.

The determination of whether a match exists between two transcriptions includes performing a textual comparison between the transcriptions. A successful match may be one that includes an exact match between the transcriptions or a comparison that results in a minimal threshold number of mismatches between the transcriptions. Also, the transcriptions may be partial transcriptions or multiple periodic transcriptions of the transmitted audio. Transcription generation and comparison of text to determine a match as well known in the art and no further explanation is necessary for a person of skill in the art to understand the disclosed subject matter.

In various embodiments, the audio mixing server 26 and the audio recordings server 28 include similar components as those in the other components for performing the functions of receiving audio and a transcription of the audio, transcribing the received audio, and comparing the transcribed audio with a received transcription of the audio.

In various embodiments, the network components (e.g., the source device 22, the conference server 24, the audio mixing server 26, the audio recording server 28, and the participant devices 30) may be a mobile phone, a tablet computer (pad), a laptop computer, a palmtop computer, a mobile internet device (MID), a wearable device, a virtual reality (VR) device, an augmented reality (AR) device, a personal digital assistant (PDA), a handheld device, a computing device or another processing device, a vehicle-mounted device, and/or any other suitable device configured to perform communication in a wired and/or wireless communication system. This is not limited in embodiments of this application.

The processors 50, 70, 80 may include any type of processing device, such as an Intel Pentium series processor, an Advanced Micro Devices (AMD) processor or another processing device. The memory is volatile and non-volatile memory, which may include, for example, random access memory (RAM), dynamic RAM (DRAM), synchronous DRAM (SDRAM), read-only memory (ROM), hard disk drive (HDD) device, and/or solid-state storage (SSD) device.

In various embodiments, in FIGS. 5-8 is a schematic flow chart diagram illustrating an embodiment of a method 100 for providing audio in a networking environment and determining legs within the networking environment that are experiencing degraded or failed audio transmission. In certain embodiments, the method 100 may be performed by a processor executing program code, for example, a microcontroller, a microprocessor, a central processing unit (CPU), a graphics processing unit (GPU), an auxiliary processing unit, an FPGA, or the like. At a block 105, audio is generated at a source device. At a block 110, a first transcription of the generated audio is generated at the source device. At a decision block 115, the source device determines if the first transcription meets a predefined standard. The standard may include determining if the first transcription can even be performed due to the generated audio being incapable of being transcribed. At a block 120, an audio problem indication is provided if it is determined that the first transcription does not meet the predefined standard. At a block 125, the generated audio and the first transcription are sent to a conference server. At a block 130, the conference server generates a second transcription of the received audio. At a decision block 135, the conference server determines if the first transcription matches the second transcription. At a block 140, an indication that an audio problem exists between the source device and the conference server is provided, if the first transcription fails to match the second transcription. At a block 145, if the first transcription matches the second transcription, the conference server optionally sends the audio and the second transcription to a recording server. At a block 150, the recording server generate a third transcription of the audio. At a block 155, the recording server provides an indication that an audio problem exists between the conference server and the recording server, if the third transcription does not match the second transcription.

At a block 160, the conference server sends the audio and the second transcription to an audio mixing server. At a block 165, the audio mixing server generates a fourth transcription and compares the second transcription to the fourth transcription. At a block 170, another audio source, such as a participant device, generates audio to be combined with the audio from the audio source. The other audio source generates a fifth transcription of its generated audio and sends the fifth transcription with the audio to the audio mixing server. At a block 175, the audio mixing server generates a sixth transcription and compares the sixth transcription to the fifth transcription. At a block 180, the audio mixing server mixes the received audio if the comparisons performed at the blocks 165 and 175 indicate a match exists between the respective transcriptions. Otherwise, indications are provided that audio problem exists between the respective components of those audio communications. At a decision block 185, the audio mixing server determines if the mixed audio is above the predefined standard. If the mixed audio is not above the predefined standard, then at a block 190, an indication that an audio problem exists at the audio mixing server is provided. At a block 195, if the mixed audio is above the predefined standard, a seventh transcription of the mixed audio is generated. At a block 200, the mixed audio and seventh transcription is sent to the conference server, which at a block 205, generates an eighth transcription and compares it to the seventh transcription. If the eighth transcription and the seventh transcription match, then, at a block 215, the conference server sends the mixed audio and the eighth transcription to the participant devices.

At a block 220, the participant devices generate a ninth transcription of the received audio. At a decision block 225, the participant devices determine if the eighth and ninth transcriptions match. If the eighth and ninth transcriptions fail to match, then, at a block 230, an indication that an audio problem exists between the conference server and the respective participant device. If the eighth and ninth transcriptions match, then, all audio links are free of audio problems. If, at a block 235, the user of the participant device reports an audio problem, then an indication that an audio problem exists at the participant device is provided.

EMBODIMENTS

A. A method in a server, the method comprising: receiving audio and a first transcription of the audio from a source device; generating a second transcription of the received audio; providing an indication of an audio problem responsive to the first transcription not matching the second transcription; and sending the audio and the second transcription to an audio mixing device, a recording device, or a participant device responsive to the first transcription matching the second transcription.

B. The method of A, wherein the first transcription fails to match the second transcription responsive to a number of textual mismatches between the first transcription and the second transcription exceeding a threshold amount.

C. The method of A or B, further comprising: receiving mixed audio and a third transcription of the mixed audio from the audio mixing device; generating a fourth transcription of the received mixed audio; and sending the mixed audio and the fourth transcription to a plurality of participant devices responsive to the third transcription matching the fourth transcription.

D. The method of C, further comprising providing an indication that an audio problem exists between the server and the audio mixing device responsive to the third transcription failing to match the fourth transcription.

E. The method of any of A-D, further comprising: receiving an indication from one of the participant devices that the third transcription fails to match a fifth transcription generated by the one of the participant devices; and providing an indication that an audio problem exists between the system and the one of the participant devices responsive to receiving the indication from the one of the participant devices that the third transcription fails to match the fifth transcription.

F. The method of any of A-E, further comprising: receiving a user generated audio problem indication from one of the participant devices; and providing an indication that an audio problem exists between an audio processor and a speaker at the one of the participant devices responsive to receiving the user generated audio problem indication.

G. The method of any of A-F, further comprising: receiving an audio problem indication from the recording device responsive to the recording device determining that a match fails to exist between the second transcription and a sixth transcription of the sent audio generated by the recording device; and providing an indication that an audio problem exists between an the recording device and the server responsive to receiving the audio problem indication from the recording device.

H. A system comprising: a processor; and a storage device configured to store machine-readable instructions, wherein execution of the machine-readable instructions that, when executed by the processor, cause the processor to: receive audio and a first transcription of the audio from a source device; generate a second transcription of the received audio; provide an indication of an audio problem responsive to the first transcription not matching the second transcription; and send the audio and the second transcription to an audio mixing device, a recording device, or a participant device responsive to the first transcription matching the second transcription.

I. The system of H, wherein the first transcription fails to match the second transcription responsive to a number of textual mismatches between the first transcription and the second transcription exceeding a threshold amount.

J. The system of H or I, wherein the machine-readable instructions further cause the processor to: receive mixed audio and a third transcription of the mixed audio from the audio mixing device; generate a fourth transcription of the received mixed audio; and send the mixed audio and the fourth transcription to a plurality of participant devices responsive to the third transcription matching the fourth transcription.

K. The system of J, wherein the machine-readable instructions further cause the processor to provide an indication that an audio problem exists between the system and the audio mixing device responsive to the third transcription failing to match the fourth transcription.

L. The system of any of H-K, wherein the machine-readable instructions further cause the processor to: receive an indication from one of the participant devices that the third transcription fails to match a fifth transcription generated by the one of the participant devices; and provide an indication that an audio problem exists between the system and the one of the participant devices responsive to receiving the indication from the one of the participant devices that the third transcription fails to match the fifth transcription.

M. The system of any of H-L, wherein the machine-readable instructions further cause the processor to: receive a user generated audio problem indication from one of the participant devices; and provide an indication that an audio problem exists between an audio processor and a speaker at the one of the participant devices responsive to receiving the user generated audio problem indication.

N. The system of any of H-M, wherein the machine-readable instructions further cause the processor to: receive an audio problem indication from the recording device responsive to the recording device determining that a match fails to exist between the second transcription and a sixth transcription of the sent audio generated by the recording device; and provide an indication that an audio problem exists between an the recording device and the system responsive to receiving the audio problem indication from the recording device.

O. A non-transitory computer-readable medium storing machine-readable instructions that, when executed by a processor of a computing system, cause the processor to: receive audio and a first transcription of the audio from a source device; generate a second transcription of the received audio; provide an indication of an audio problem responsive to the first transcription not matching the second transcription; and send the audio and the second transcription to an audio mixing device, a recording device, or a participant device responsive to the first transcription matching the second transcription.

P. The non-transitory computer-readable medium of O, wherein the first transcription fails to match the second transcription responsive to a number of textual mismatches between the first transcription and the second transcription exceeding a threshold amount.

Q. The non-transitory computer-readable medium of O or P, wherein the machine-readable instructions further cause the processor to: receive mixed audio and a third transcription of the mixed audio from the audio mixing device; generate a fourth transcription of the received mixed audio; and send the mixed audio and the fourth transcription to a plurality of participant devices responsive to the third transcription matching the fourth transcription.

R. The non-transitory computer-readable medium of Q, wherein the machine-readable instructions further cause the processor to provide an indication that an audio problem exists between the system and the audio mixing device responsive to the third transcription failing to match the fourth transcription.

S. The non-transitory computer-readable medium of any of O-R, wherein the machine-readable instructions further cause the processor to: receive an indication from one of the participant devices that the third transcription fails to match a fifth transcription generated by the one of the participant devices; and provide an indication that an audio problem exists between the computing system and the one of the participant devices responsive to receiving the indication from the one of the participant devices that the third transcription fails to match a fifth transcription.

T. The non-transitory computer-readable medium of any of O-S, wherein the machine-readable instructions further cause the processor to: receive a user generated audio problem indication from one of the participant devices; and generate an indication that an audio problem exists between an audio processor and a speaker at the one of the participant devices responsive to receiving the user generated audio problem indication.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method in a server, the method comprising:
receiving audio and a first transcription of the audio from a source device;
generating a second transcription of the received audio;
comparing the second transcription to the first transcription;
providing an indication of an audio problem responsive to the first transcription not matching the second transcription;
sending the audio and the second transcription to an audio mixing device, a recording device, one of a plurality of participant devices responsive to the first transcription matching the second transcription or some combination thereof;
receiving a user generated audio problem indication from one of the participant devices; and
providing an indication that an audio problem exists between an audio processor and a speaker at the one of the participant devices responsive to receiving the user generated audio problem indication,
wherein the first transcription fails to match the second transcription responsive to a number of textual mismatches between the first transcription and the second transcription exceeding a threshold amount.

2. The method of claim 1, further comprising:
receiving mixed audio and a third transcription of the mixed audio from the audio mixing device;
generating a fourth transcription of the received mixed audio; and
sending the mixed audio and the fourth transcription to a plurality of participant devices responsive to the third transcription matching the fourth transcription.

3. The method of claim 2, further comprising providing an indication that an audio problem exists between the server and the audio mixing device responsive to the third transcription failing to match the fourth transcription.

4. The method of claim 2, further comprising:
receiving an indication from one of the participant devices that the third transcription fails to match a fifth transcription generated by the one of the participant devices; and
providing an indication that an audio problem exists between the server and the one of the participant devices responsive to receiving the indication from the one of the participant devices that the third transcription fails to match the fifth transcription.

5. The method of claim 1, further comprising:
receiving an audio problem indication from the recording device responsive to the recording device determining that a match fails to exist between the second transcription and a sixth transcription of the sent audio generated by the recording device; and
providing an indication that an audio problem exists between an the recording device and the server responsive to receiving the audio problem indication from the recording device.

6. A system comprising:
a processor; and
a storage device configured to store machine-readable instructions, wherein execution of the machine-readable instructions that, when executed by the processor, cause the processor to:
receive audio and a first transcription of the audio from a source device;
generate a second transcription of the received audio;
compare the second transcription to the first transcription;
provide an indication of an audio problem responsive to the first transcription not matching the second transcription;
send the audio and the second transcription to an audio mixing device, a recording device, a participant device responsive to the first transcription matching the second transcription or some combination thereof;
receive a user generated audio problem indication from one of the participant devices; and
provide an indication that an audio problem exists between an audio processor and a speaker at the one of the participant devices responsive to receiving the user generated audio problem indication,
wherein the first transcription fails to match the second transcription responsive to a number of textual mismatches between the first transcription and the second transcription exceeding a threshold amount.

7. The system of claim 6, wherein the machine-readable instructions further cause the processor to:
receive mixed audio and a third transcription of the mixed audio from the audio mixing device;
generate a fourth transcription of the received mixed audio; and
send the mixed audio and the fourth transcription to a plurality of participant devices responsive to the third transcription matching the fourth transcription.

8. The system of claim 7, wherein the machine-readable instructions further cause the processor to provide an indication that an audio problem exists between the system and the audio mixing device responsive to the third transcription failing to match the fourth transcription.

9. The system of claim 7, wherein the machine-readable instructions further cause the processor to:
receive an indication from one of the participant devices that the third transcription fails to match a fifth transcription generated by the one of the participant devices; and
provide an indication that an audio problem exists between the system and the one of the participant devices responsive to receiving the indication from the one of the participant devices that the third transcription fails to match the fifth transcription.

10. The system of claim 6, wherein the machine-readable instructions further cause the processor to:
receive an audio problem indication from the recording device responsive to the recording device determining that a match fails to exist between the second transcription and a sixth transcription of the sent audio generated by the recording device; and
provide an indication that an audio problem exists between an the recording device and the system responsive to receiving the audio problem indication from the recording device.

11. A non-transitory computer-readable medium storing machine-readable instructions that, when executed by a processor of a computing system, cause the processor to:
receive audio and a first transcription of the audio from a source device;
generate a second transcription of the received audio;
compare the second transcription to the first transcription;
provide an indication of an audio problem responsive to the first transcription not matching the second transcription;

send the audio and the second transcription to an audio mixing device, a recording device, a participant device responsive to the first transcription matching the second transcription, or some combination thereof;

receive a user generated audio problem indication from one of the participant devices; and generate an indication that an audio problem exists between an audio processor and a speaker at the one of the participant devices responsive to receiving the user generated audio problem indication, wherein the first transcription fails to match the second transcription responsive to a number of textual mismatches between the first transcription and the second transcription exceeding a threshold amount.

12. The non-transitory computer-readable medium of claim 11, wherein the machine-readable instructions further cause the processor to:

receive mixed audio and a third transcription of the mixed audio from the audio mixing device;

generate a fourth transcription of the received mixed audio; and send the mixed audio and the fourth transcription to a plurality of participant devices responsive to the third transcription matching the fourth transcription.

13. The non-transitory computer-readable medium of claim 12, wherein the machine-readable instructions further cause the processor to provide an indication that an audio problem exists between the system and the audio mixing device responsive to the third transcription failing to match the fourth transcription.

14. The non-transitory computer-readable medium of claim 12, wherein the machine-readable instructions further cause the processor to:

receive an indication from one of the participant devices that the third transcription fails to match a fifth transcription generated by the one of the participant devices; and provide an indication that an audio problem exists between the computing system and the one of the participant devices responsive to receiving the indication from the one of the participant devices that the third transcription fails to match a fifth transcription.

* * * * *